June 10, 1958 F. W. DE VRIJER 2,838,597

MULTIPLEX TELEVISION SYSTEM

Filed April 28, 1953

INVENTOR.
Frederik Willem de Vrijer
BY
[signature]
Agent

United States Patent Office 2,838,597

Patented June 10, 1958

2,838,597

MULTIPLEX TELEVISION SYSTEM

Frederik Willem de Vrijer, Eindhoven, Netherlands, assignor, by mesne assignments, to North American Philips Company, Inc., New York, N. Y., a corporation of Delaware Application April 28, 1953, Serial No. 351,575

Claims priority, application Netherlands May 1, 1952

6 Claims. (Cl. 178—5.2)

Figure 1:
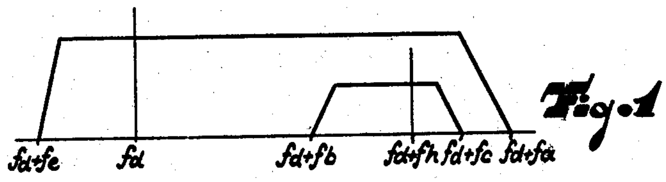

The invention relates to television systems, more particularly to multiplex transmission systems for the transmission of television pictures, of the kind used for example, in colour television or of similar images which are line-scanned there being no need at the receiving end to use for the separation of the signals used for transmission either a colour switch having line, field or frame image frequency or an auxiliary carrier wave or dot-signal of correct shape, frequency and phase.

In multiplex transmission systems for three television signals the most important signal, for example the brightness signal, hereinafter referred to as the main signal, frequently occupies the greater part of the available video frequency bandwidth.

The first supplementary signal, for example a colour signal, is caused to modulate an auxiliary carrier wave comprising one or two entire or partial side bands and lies entirely within the frequency range of the main signal, the frequency of the auxiliary carrier wave being an odd multiple of half the line frequency.

The second supplementary signal, likewise a colour signal, is also caused to modulate an auxiliary carrier wave comprising one or two entire or partial side band and lies either entirely without the frequency range of the main signal or entirely or in part within it, but always so that overlapping of the frequency range required for the first supplementary signal does not occur.

When the frequency range used for the second supplementary signal lies entirely or in part within the frequency range of the main signal, also this second auxiliary carrier wave has a frequency which is an odd multiple of half the line frequency, since as is well known, all of the frequencies in the band used for a television signal are not used to the same extent.

Analysis of the video signal obtained by scanning the image according to a line frame shows that the energy of the signal is concentrated for the greater part at frequencies adjacent the harmonics of the line frequency.

If the frequency of an auxiliary carrier wave lies between two harmonics of the line frequency and a video signal of the same line frequency as the main signal is caused to modulate it, the most intensely occupied frequency ranges of this modulated auxiliary carrier wave will just fall between the least occupied ranges of the main signal. The interference in the reproduction of the main signal caused by the modulated auxiliary carrier wave will be precisely of opposite polarity in successive images. The interference in the image formed by the main signal will be compensated by the eye and thus generally not be inconvenient. The same remark applies to the interference produced by the main signal in the signal caused to modulate the auxiliary carrier wave.

In addition, experiment has shown that it is preferable for an auxiliary carrier wave and its side bands to lie in the frequency range of the main signal comprising the highest frequencies of this signal, since the lower frequencies are more essential for the primary formation of the image.

If the main signal is required to have a frequency spectrum which extends across the entire available frequency band and if two auxiliary carrier waves and their respective side bands are each located in a separate frequency range of the available band at auxiliary carrier wave frequencies which are equal to an odd multiple of half the line frequency, one of the auxiliary carrier waves and its side bands will become located by necessity in the frequency range of the main signal comprising the lower frequencies of this signal. The system according to the invention mitigates this disadvantage and is characterised in that the frequency band of each of $k$ supplementary singals each consisting of an auxiliary carrier wave and one or two entire or partial side bands $k>1$, coincides wholly or in part with the frequency band of the other $k-1$ supplementary signals and in that the auxiliary carrier waves of the said $k$ supplementary signals have frequencies which are $$\left(n_m+\frac{m}{k+1}\right)$$

times the line frequency, $n_m$ and $m$ being integral numbers and $m$ being equal to 1, 2, 3 . . . $k$. In the case of three-colour television $k$ is equal to 2.

Figure 2:
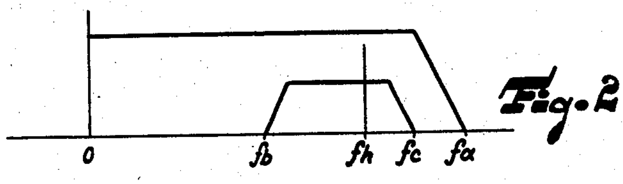
Figure 3:
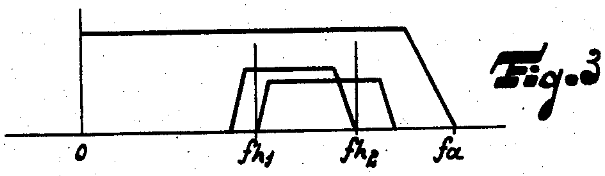
Figures 4, 5:
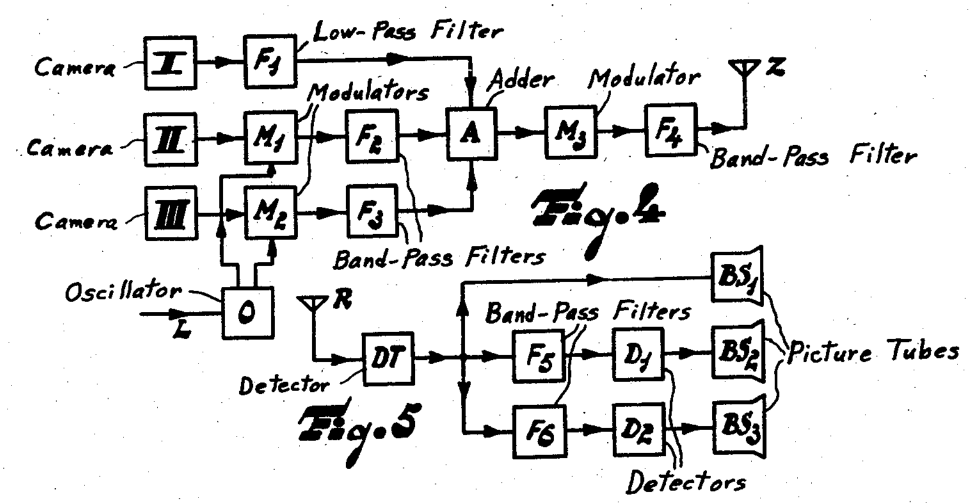
Figure 6:
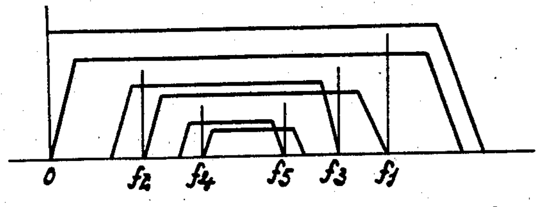

The system according to the invention and the transmitter and receiver for use in this system will now be described with reference to the accompanying diagrammatic drawing, given by way of example, in which:

Fig. 1 shows the frequency spectrum of two television signals in the transmission channel, Fig. 2 shows the frequency spectrum of two television signals at the transmitter end, Fig. 3 the frequency spectrum of three television signals at the transmitter end in accordance with the system of the invention, Fig. 4 shows a diagrammatic embodiment of a transmitter according to the invention, Fig. 5 a diagrammatic embodiment of a receiver associated with a transmitter as shown in Fig. 4, and Fig. 6 shows a frequency spectrum for 6 television signals at the transmitter end in accordance with the system of the invention.

Referring now to the figures, Fig. 1 shows the frequency spectrum of two television signals in a transmission frequency band which extends from a frequency $f_d+f_e$ to a frequency $f_d+f_a$.

Such a frequency spectrum is produced by causing a carrier wave $f_d$ to be modulated by two signals extending across frequency bands from 0 to $f_a$ and from $f_b$ to $f_c$, as shown in Fig. 2, and by partially rejecting the lower side band.

Thus the main signal extends to the frequency $f_a$, the second signal from the frequency $f_b$ to the frequency $f_c$ and the last-mentioned is produced by causing a second video signal to modulate an auxiliary carrier wave having a frequency $f_h$ which is an odd multiple of half the line frequency and comprising a lower side band extending to $f_b$ and an upper side band extending to $f_c$.

If the main signal is required to extend to $f_a$, a third signal which may also be required to be transmitted in the available frequency band will have to be located somewhere between the frequencies 0 and $f_b$ by causing this signal to modulate an auxiliary carrier wave having a frequency which is an odd multiple of half the line frequency.

However, this gives rise to the above mentioned difficulty of interfering with the lower frequencies of the main signal.

Fig. 3 shows the frequency spectrum of the signal required to be transmitted in the system according to the invention.

The available frequency band is assumed to be again limited by the frequency $f_a$ so that the main signal extends from a frequency 0 to $f_a$.

An auxiliary carrier wave $f_{h1}$ is caused to be modulated by a second signal, for example primarily in the upper side band, and an auxiliary carrier wave $f_{h2}$ is modulated by a third signal, for example primarily in the lower side band, $f_{h1}$ being less than $f_{h2}$.

To minimize the mutual interference of the concentrations of energy of the three signals the frequency of one of the auxiliary carrier waves is made $(n+1/3)$ times the line frequency and the frequency of the other auxiliary carrier wave $(m+2/3)$ times the line frequency, $n$ and $m$ being whole numbers.

Upon modulation, if required, of a carrier wave $f_d$ at the transmitter end and demodulation at the receiver end, the signal shown in Fig. 3 is obtained in the receiver. This signal is supplied, for example as a whole, to a control electrode of a picture tube, and also to two selective detection devices, one of which is tuned to the frequency $f_{h1}$ and the other to the frequency $f_{h2}$. The output signals of these detection devices may be supplied to the control electrodes of two separate picture tubes respectively. Each of the picture tubes is found to contain apart from the signal desired, interference due to the two other signals which, as a result of the above mentioned choice of the auxiliary carrier wave frequencies, is $2\pi/3$ radians out of phase with the interference in a preceding image and consequently is compensated after three images.

Strickly speaking this is only the case when a stationary image is transmitted.

However, if the frame frequency is not excessively small, this will also approximately be the case with moving objects and, due to the inertia of the eye, which is adjusted to mean values in time, the influence of the interference is substantially counteracted from the optical point of view.

Fig. 4 shows a block schematic diagram of a simplified embodiment of a transmitter for use in the multiplex transmission system according to the invention.

The devices I, II and III each comprise a pick-up camera by which the main signal and the two other signals respectively are produced and also comprise, if desired, further devices by which the signals provided by the cameras are utilised in a given manner.

Thus, for example, I may provide the green image signal and the high frequencies of red and blue, II the low frequencies of the red image signal and III the low frequencies of the blue image signal (so called "mixed highs").

The main signal provided by I is fed to a low-pass filter $F_1$ having a cut-off frequency $f_a$.

The output signal of II is fed to a modulator $M_1$ in which it is caused to modulate an auxiliary carrier wave having a frequency $f_{h1}$ equal to $(n+1/3)$ times the line-frequency. This carrier wave is taken from a device O which comprises a suitable oscillator and is controlled by means of the synchronizing pulses received at L. The said carrier wave, which is modulated by the output signal of II, is fed to a band-pass filter $F_2$, the upper cut-off frequency of which is less than $f_{h2}$, the lower being less than $f_{h1}$.

The ouput signal III is fed to a modulation $M_2$, in which it is caused to modulate a carrier wave having the frequency $f_{h2}$, which is $(m+2/3)$ times the line-frequency.

The output signal of this modulator is fed to a band-pass filter $F_3$, the lower cut-off frequency of which exceeds $f_{h1}$, the upper exceeding $f_{h2}$.

The output signals of the three filters $F_1$, $F_2$, and $F_3$ are then additively combined in a booster device A.

The combined signal may be transmitted by wire or, as shown in Fig. 4, be fed to a transmitter aerial Z upon its modulation of a high-frequency carrier wave in a modulator $M_3$ and subsequent band-width limitation in a band-pass filter $F_4$.

It is obvious that instead of being made $(n+1/3)$ times the line-frequency it is equally possible for $f_{h1}$ to be made $(n+2/3)$ times the line-frequency. However, in that case $f_{h2}$ is $(m+1/3)$ times the line-frequency.

Fig. 5 is a block schematic diagram of a simplified embodiment of a receiver in a multiplex transmission system according to the invention for use in receiving signals transmitted by the transmitter shown in Fig. 4.

The signal received by a receiving aerial R is fed to a detection stage DT which produces a signal as shown in Fig. 3.

The output signal of DT is fed on the one hand to a picture tube $BS_1$, on the other to two band-pass filters $F_5$ and $F_6$.

The pass range of the band-pass filter $F_5$ has an upper cut-off frequency which is smaller than $f_{h2}$ and a lower cut-off frequency which is smaller than $f_{h1}$, and the pass range of the band-pass filter $F_6$ has an upper cut-off frequency exceeding $f_{h2}$ and a lower cut-off frequency exceeding $f_{h1}$.

The output signals of $F_5$ and $F_6$ are fed to detectors $D_1$ and $D_2$ respectively.

The combination $F_5$—$D_1$ constitutes a detector circuit tuned to the carrier wave $f_{h1}$ and provides the signal by which $f_{h1}$ is modulated together with interference produced by the two other signals, which, however, due to the above mentioned choice of the carrier wave frequencies is substantially counteracted in the picture tube $BS_2$ as far as the eye is concerned.

The combination $F_6$—$D_2$ similarly constitutes a detector circuit tuned to the carrier wave $f_{h2}$ and provides the picture tube $BS_3$ with the signal which is caused to modulate $f_{h2}$ together with interference due to the two other signals.

The images produced on the three picture tubes have to be combined optically, but as an alternative use may be made of a three-colour tube.

In this case the output signals of DT, $D_1$ and $D_2$ have to be fed each to the control electrode of the associated electron gun. In accordance with the nature of the television signals combinations of the output signals of DT, $D_1$ and $D_2$ may be supplied to the respective control electrodes of the picture tubes or of the three-colour tube, as is the case, for example, in the N. T. S. C. colour television system.

In a normal black-and-white receiver the signal transmitted by the transmitter shown in Fig. 4 will produce a similar image as in the picture tube $BS_1$ of the receiver for the system according to the invention. The main signal thus produced therein contains sufficient information value to achieve a highly satisfactory result.

Owing to the above choice of the auxiliary carrier wave frequencies the interference due to the two other signals will be substantially counteracted as far as the eye is concerned.

In addition, the receiver for use in the system according to the invention is suited to the reception of a signal transmitted by a normal black-and-white transmitter. The only thing required for this purpose is for example, to supply the output signal of DT to all of the three picture tubes.

Suitable modulators, filters, oscillators, detectors, and additive circuits, used in the preferred form of practicing the invention, are well known to those skilled in the art and therefore have not been explained in detail.

The system according to the invention may be extended by providing $k$ auxiliary carrier waves in a main signal; in this case one or more auxiliary carrier waves and their side bands may become located in the frequency range comprising the lower frequencies of the main signal. In this event, much value is consequently placed on transmission of more than two supplementary signals within a limited frequency range, and not first of all on their being transmitted in an optimum manner, as is the case with transmission of two supplementary signals.

If each signal comprising an auxiliary carrier wave and its side bands coincides at least in part with all the other signals comprising auxiliary carrier waves and their side bands, in order to minimize interference of other signals in a given signal the said auxiliary carrier waves must be placed in frequencies which are $$\left(n_1+\frac{1}{k+1}\right), \left(n_2+\frac{2}{k+1}\right) \cdots \left(n_k+\frac{k}{k+1}\right)$$

times the line frequency, $n_1$, $n_2$ . . . $n_k$ being integral numbers.

Thus interference is compensated in $(k+1)$ times the picture time. Fig. 6 shows, by way of example, a frequency spectrum according to the system of the invention as available at the transmitter end for 6 television signals such as may be used for stereo-colour television. Since in this case there are 5 auxiliary carrier waves, compensation of the interference will be ensured in 6 pictures.

What is claimed is:

1. A multiplex system for the transmission and reception of television pictures which are line-scanned comprising transmitting apparatus including means for producing a main signal representative of picture brightness information and having a predetermined frequency band, and means for producing a plurality of supplementary signals, each of said supplementary signals comprising an auxiliary carrier wave and at least one side band, lying in said main signal frequency band and having a frequency band which coincides at least in part with the frequency bands of the other signals of said supplementary signals, said auxiliary carrier waves of said supplementary signals having frequencies which are $$\left(n_m+\frac{m}{k+1}\right)$$

times the line frequency, $k$ being equal to the number of supplementary signals, $n_m$ and $m$ being integral numbers and $m$ being equal to 1, 2, 3 . . . $k$; and receiving apparatus for said main signal and said plurality of supplementary signals, said receiving apparatus including a plurality of selective detectors arranged so that the $m$th of said detectors is tuned to a frequency which is $$\left(n_m+\frac{m}{k+1}\right)$$

times the line frequency.

2. A transmitter in a multiplex system for the transmission of television pictures which are line-scanned comprising transmitting apparatus including means for producing a main signal representative of picture brightness information and having a predetermined frequency band, and means for producing a plurality of supplementary signals, each of said supplementary signals comprising an auxiliary carrier wave and at least one side band, lying in said main signal frequency band and having a frequency band which coincides at least in part with the frequency bands of the other signals of said supplementary signals, said auxiliary carrier waves of said supplementary signals having frequencies which are $$\left(n_m+\frac{m}{k+1}\right)$$

times the line frequency, $k$ being equal to the number of supplementary signals, $n_m$ and $m$ being integral numbers and $m$ being equal to 1, 2, 3, . . . $k$.

3. In a multiplex system for the transmission and reception of television pictures which are line-scanned and wherein there is produced a main signal representative of picture brightness information and having a predetermined frequency band and a plurality of supplementary signals, each of said supplementary signals comprising an auxiliary carrier wave and at least one side band, lying in said main signal frequency band and having a frequency band which coincides at least in part with the frequency bands of the other signals of said supplementary signals, said auxiliary carrier waves of said supplementary signals having frequencies which are $$\left(n_m+\frac{m}{k+1}\right)$$

times the line frequency, $k$ being equal to the number of supplementary signals, $n_m$ and $m$ being integral numbers and $m$ being equal to 1, 2, 3, . . . $k$, is used; a multiplex receiver comprising means for intercepting and demodulating said main signal and said plurality of supplementary signals, and a plurality of selective detectors coupled to said demodulating means and arranged so that the $m$th of said detectors is tuned to a frequency which is $$\left(n_m+\frac{m}{k+1}\right)$$

times the line frequency.

4. A multiplex system for the transmission and reception of signals representing the primary colors in color television pictures which are line-scanned comprising a first pick-up camera apparatus for producing a main signal having a predetermined frequency band and including signals representing one of said primary colors and the high frequencies of the other primary colors, a first filter circuit coupled to said first pickup camera and having a cut-off frequency equal to said main signal frequency band, a second pick-up camera apparatus for producing signals representing a second primary color, a first modulator coupled to said second apparatus, a third pick-up camera apparatus for producing signals representing a third primary color, a second modulator coupled to said third apparatus, a pluse synchronized oscillatory circuit, said oscillatory circuit being adapted to supply a first auxiliary carrier wave having a frequency equal to $(n+1/3)$ times the line frequency to said first modulator and to supply a second auxiliary carrier wave having a higher frequency equal to $(m+2/3)$ times the line frequency to said second modulator, $n$ and $m$ being whole numbers, a first band-pass filter circuit coupled to said first modulator and having an upper cut-off frequency which is less than the frequency of said second auxiliary carrier wave and a lower cut-off frequency which is within said main frequency band and less than the frequency of said first auxiliary carrier, a second band-pass filter circuit coupled to said second modulator and having a lower cut-off frequency which exceeds the frequency of said first auxiliary carrier wave and an upper cut-off frequency which is within said main frequency band and which exceeds the frequency of said second auxiliary carrier wave, the lower cut-off frequency of said second band-pass filter circuit being lower than the upper cut-off frequency of said first band-pass filter circuit, an adder coupled to each of said filters for additively combining the signals which pass through said filters, means for transmitting said combined signals, means for receiving said transmitter signals, a first television image reproducing device coupled to said receiving means, a third band-pass filter circuit coupled to said receiving means and having upper and lower cut-off frequencies which correspond to the upper and lower cut-off frequencies, respectively, of said first band-pass filter circuit, a second television image reproducing device, a first detector interposed between said second device and said third band-pass filter circuit, a fourth band pass filter circuit coupled to said receiving means and having upper and lower cut-off frequencies corresponding to the upper and lower cut-off frequencies, respectively, of said second band-pass filter circuit, a third television image reproducing device, and a second detector interposed between said third device and said fourth band-pass filter circuit.

5. A transmitter in a multiplex system for the transmission of signals representing the primary colors in color television pictures which are line-scanned comprising a first pick-up camera apparatus for producing a main signal having a predetermined frequency band and including signals representing one of said primary colors and the high frequencies of the other primary colors, a low-pass filter circuit coupled to said first pick-up camera and having a cut-off frequency equal to said main signal frequency band, a second pick-up camera apparatus for producing signals representing a second primary color, a first modulator coupled to said second apparatus, a third pick-up camera apparatus for producing signals representing a third primary color, a second modulator coupled to said third apparatus, a pulse synchronized oscillatory circuit, said oscillatory circuit being adapted to supply a first auxiliary carrier wave having a frequency equal to $(n+1/3)$ times the line frequency to said first modulator and to supply a second auxiliary carrier wave having a higher frequency equal to $(m+2/3)$ times the line frequency to said second modulator, $n$ and $m$ being whole numbers, a first band-pass filter circuit coupled to said first modulator and having an upper cut-off frequency which is less than the frequency of said second auxiliary carrier wave and a lower cut-off frequency which is within said main frequency band and less than the frequency of said first auxiliary carrier, a second band-pass filter circuit coupled to said second modulator and having a lower cut-off frequency which exceeds the frequency of said first auxiliary carrier wave and an upper cut-off frequency which is within said main frequency band and which exceeds the frequency of said second auxiliary carrier wave, the lower cut-off frequency of said second band-pass filter circuit being lower than the upper cut-off frequency of said first band-pass filter circuit, an adder coupled to each of said filters for additively combining the signals which pass through said filters, and means for transmitting said combined signals.

6. A receiver in a multiplex system for the transmission of signals representing the primary colors in color television pictures which are line-scanned, said signals being produced by means including a first pick-up camera apparatus for producing a main signal having a predetermined frequency band and including signals representing one of said primary colors and the high frequencies of the other primary colors, a low-pass filter circuit coupled to said first pick-up camera and having a cut-off frequency equal to said main signal frequency band, a second pick-up camera apparatus for producing signals representing a second primary color, a first modulator coupled to said second apparatus, a third pick-up camera apparatus for producing signals representing a third primary color, a second modulator coupled to said third apparatus, a pulse synchronized oscillatory circuit, said oscillatory circuit being adapted to supply a first auxiliary carrier wave having a frequency equal to $(n+1/3)$ times the line frequency to said first modulator and to supply a second auxiliary carrier wave having a higher frequency equal to $(m+2/3)$ times the line frequency to said second modulator, $n$ and $m$ being whole numbers, a first band-pass filter circuit coupled to said first modulator and having an upper cut-off frequency which is less than the frequency of said second auxiliary carrier wave and a lower cut-off frequency which is within said main frequency band and less than the frequency of said first auxiliary carrier, a second band-pass filter circuit coupled to said second modulator and having a lower cut-off frequency which exceeds the frequency of said first auxiliary carrier wave and an upper cut-off frequency which is within said main frequency band and which exceeds the frequency of said second auxiliary carrier wave, the lower cut-off frequency of said second band-pass filter circuit being lower than the upper cut-off frequency of said first band-pass filter circuit, an adder coupled to each of said filters for additively combining the signals which pass through said filters, and means for transmitting said combined signals, said receiver comprising means for receiving said transmitted signals, a first television image reproducing device coupled to said receiving means, a third band-pass filter circuit coupled to said receiving means and having upper and lower cut-off frequencies which correspond to the upper and lower cut-off frequencies, respectively, of said first band-pass filter circuit, a second television image reproducing device, a first detector interposed between said second device and said third band-pass filter circuit, a fourth band-pass filter circuit coupled to said receiving means and having upper and lower cut-off frequencies corresponding to the upper and lower cut-off frequencies, respectively, of said second band-pass filter circuit, a third television image reproducing device, and a second detector interposed between said third device and said fourth band-pass filter circuit.

References Cited in the file of this patent

UNITED STATES PATENTS

| | | |
|---|---|---|
| 2,554,693 | Bedford | May 29, 1951 |
| 2,559,843 | Bedford | July 10, 1951 |
| 2,580,903 | Evans | Jan. 1, 1952 |
| 2,634,324 | Bedford | Apr. 7, 1953 |
| 2,635,140 | Dome | Apr. 14, 1953 |
| 2,657,253 | Bedford | Oct. 27, 1953 |